Figure 1:
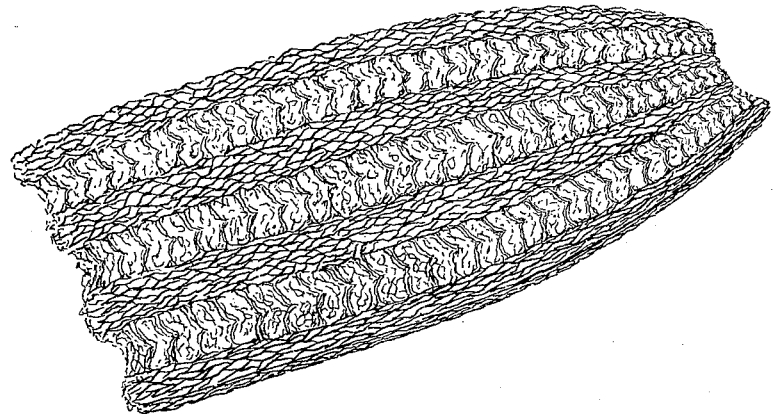

(Model.)

C. T. LEE.
HEAD COVERING AND METHOD OF MAKING THE SAME.

No. 372,543. Patented Nov. 1, 1887.

WITNESSES.
Frank G. Parker
Fred B. O'Neil

INVENTOR.
C. Tennant Lee
by Geo. D. G. Goale
his atty.

United States Patent Office.

C. TENNANT LEE, OF BOSTON, MASSACHUSETTS.

HEAD-COVERING AND METHOD OF MAKING THE SAME.

SPECIFICATION forming part of Letters Patent No. 372,543, dated November 1, 1887.

Application filed April 19, 1886. Serial No. 199,406. (Model.)

*To all whom it may concern:*

Be it known that I, C. TENNANT LEE, of Boston, in the county of Suffolk and State of Massachusetts, have invented a new and useful Improvement in the Manufacture of Head-Coverings and other Shaped Articles, of which the following is a specification.

My invention relates to the utilization of the fruit of what is commonly known as the "dish-cloth gourd," by so treating it that the mucilaginous substance which its fiber contains is rendered effective as a stiffening, so that there may be shaped or molded from its fibrous fabric head-coverings and other light articles, which will be sufficiently stiff for all ordinary uses without the addition of such wire frames or other means as have heretofore been necessary in the manufacture of such articles.

The dish cloth gourd, as it is ordinarily termed, belongs to the botanical family *Cucurbitaceæ*, genus *Luffa*, and species *Acutangula*, *Cylindrica*, or *Ægyptiaca*. These names of the species appear to be employed interchangeably to designate substantially the same plant, the only difference between the *Cylindrica* and the *Acutangula* being in the character of the outer skin, the inside portions of each being of the same fibrous texture. This *Luffa acutangula*, as it may be called, is found in the Antilles and throughout the tropics generally. It also grows in the southern portion of the United States and in Japan. It is a vine which produces seed-pods, which often attain considerable size, and which have fibrous linings composed of interlacing fibers. These linings constitute the material to which my improved process is applied in the construction of head-wear, for they contain a gum or mucilaginous substance which reveals itself when the fabric is moistened, and hence serves as a stiffener after the moistened fabric has been dried. The fleshy interior of the *Luffa*, on ripening, is absorbed largely by the formation of the fiber, and there is left, besides the seeds, only a mucilaginous slime upon the inner surface of the fruit, which, drying naturally, as the fruit hangs on the vine, leaves a pliant and in nowise rigid thickening material. When the dried fiber is moistened with water, (as in the course of my process hereinafter described,) this thickening material or mucilaginous part is dissolved and distributed throughout the fibers, which, upon drying, become rigid, being permeated and enveloped by the dried gum. The fruit which has never been wet remains for an indefinite time pliant. The gummy part is within the fruit ready to be dissolved by wetting; but without this wetting the gum is inoperative, and although it can sometimes be seen in colorless flakes, it lies too closely upon the inner surface of the fiber to be removed by mechanical means.

Figure 2:
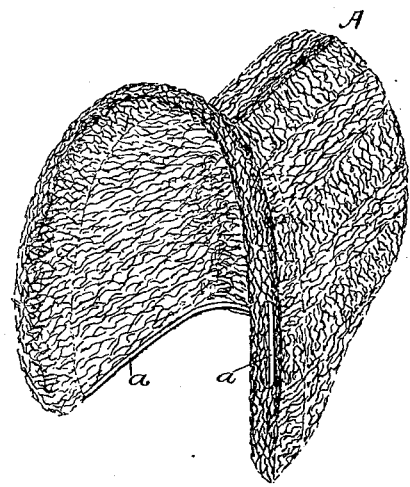
Figure 3:
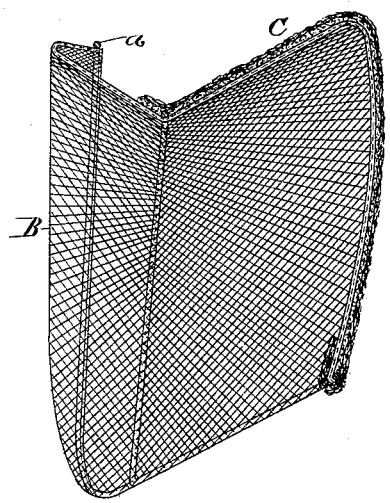

In the drawings, at Figure 1 is shown a piece of a natural fabric made by drying and cleaning the fruit in the manner below described, and at Fig. 2 is shown a bonnet made from the material according to my process, Fig. 3 showing one method of applying the process.

A is a bonnet which is made under pressure from such fabric, *a* being such a wire as is ordinarily used to finish a raw edge so as to prevent it from tearing.

B is an ordinary bonnet-frame, which is here used as a former, and over which has been bent a piece of said fabric C, said piece having been so treated that it has taken the shape of the frame under it so as to duplicate in this fabric the form of the bonnet-frame.

The fruit when mature is freed from its outer covering or skin and is split open and the seeds and so much of the interior or placentæ as is desired are taken out, leaving a natural fabric of fibrous layers closely connected. On that side of the fabric which has lain next the skin of the gourd the fabric is comparatively smooth. On the other side it is striped by reason of the placentæ, which hold the seeds. My process applied to this fabric is as follows: It is first wet and is then formed, either by hand or over a former or in a mold, into the desired shape while still wet, and is afterward dried, being retained in the desired shape either under pressure or not during the drying. It may be cut to the desired shape either while wet or dry, and either side may be made the outer side of the finished article. If formed under pressure, the fabric will be more or less compacted together according to the amount of pressure used. The pressure may be given by the molds ordinarily used in the manufacture of straw articles, which molds are too well known to require description.

When formed without pressure, the wet fabric may be laid over an ordinary bonnet-frame or other foundation (depending upon the desired shape of the finished article) and fastened thereto either permanently or not, as thought best. (See Fig. 3.) When dry, it will be found to have acquired the shape of the frame over which it was bent, which shape it will retain permanently without any further treatment.

The fabric may be pierced by sewing before being molded, like any other fabric, thus making a sheet of the desired size for use. Trimming, of the same or other materials, may be sewed or otherwise attached to it. Like straw, it may be dyed or bleached.

The finished material has substantially the elasticity of braided straw, and is sufficiently stiff, when shaped without pressure, for all the purposes for which straw is used, by reason of the mucilaginous character of its fabric.

I neither claim the use of shellac or other substance for the purpose of stiffening a hat-body or a material to be made into a hat-body; nor do I claim, broadly, the use of a fabric similar to that above described as a material to be cut and sewed into the shape of a head-covering, as I am aware that similar fabrics have been used for this purpose. So far as I am informed, however, such fabrics have heretofore been utilized by being cut into the desired shapes, the pieces being sewed together over and onto a frame of buckram or other suitable material without any previous treatment, the head-covering being further stiffened by wires or other means usually adopted in the manufacture of straw goods.

In the improved head-covering which I produce the superficial surface of the fibrous inner linings of which it is composed is smooth and devoid of placentæ ridges, thus presenting a neat appearance; and, further, as a result of having the superficies in smooth continuity, the inner and outer surfaces of the said fibrous linings will be substantially or approximately the same distance apart.

My invention is based upon the discovery that the fabric referred to contains a gum which by proper treatment may be rendered effective as a substitute for the permanent wire or buckram frame upon which manufacturers have heretofore sewed suitably-shaped pieces of other fabrics, as well as for the foreign substance with which it is customary to stiffen hats or bonnets made of other materials, my article so made, as above described, being at once a bonnet-frame which may be covered with silk or other woven materials, and a bonnet complete and ornamental in itself.

What I claim as my invention is—

1. The herein-described process of treating the fibrous linings of the *Luffa acutangula* in the manufacture of head-wear, which consists in first wetting the said linings to develop their mucilaginous matter, then shaping them into the desired form while still wet, and then allowing them to dry and harden in this form, thus rendering the mucilaginous matter effective as a stiffener, substantially as described.

2. As an improved article of manufacture, the self sustaining head-covering herein described, made from the fibrous inner lining of the *Luffa acutangula*, the compressed body of said fibrous inner lining presenting an outer and an inner surface lying in planes approximately equidistant from each other, as set forth.

In testimony whereof I have hereunto subscribed my name this 15th day of April, A. D. 1886.

C. TENNANT LEE.

Witnesses:
 GEORGE O. G. COALE,
 FRED B. O'NEIL.